United States Patent
Ganjam et al.

(10) Patent No.: US 9,317,544 B2
(45) Date of Patent: *Apr. 19, 2016

(54) INTEGRATED FUZZY JOINS IN DATABASE MANAGEMENT SYSTEMS

(75) Inventors: Kris Ganjam, Seattle, WA (US); Vivek Ravindranath Narasayya, Redmond, WA (US); Raghav Kaushik, Bellevue, WA (US); Arvind Arasu, Bothell, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

This patent is subject to a terminal disclaimer.

(21) Appl. No.: 13/253,315

(22) Filed: Oct. 5, 2011

(65) Prior Publication Data

US 2013/0091120 A1 Apr. 11, 2013

(51) Int. Cl.
*G06F 7/00* (2006.01)
*G06F 17/30* (2006.01)

(52) U.S. Cl.
CPC .... *G06F 17/30303* (2013.01); *G06F 17/30533* (2013.01)

(58) Field of Classification Search
CPC .............. G06F 17/30303; G06F 17/30533; G06F 17/30569; G06F 17/30985
USPC .......... 707/714, 697, 741, 769, 780, E17.002, 707/E17.017
See application file for complete search history.

(56) References Cited

U.S. PATENT DOCUMENTS

| | | | |
|---|---|---|---|
| 6,721,754 | B1 | 4/2004 | Hurst et al. |
| 2003/0041047 | A1 | 2/2003 | Chang |
| 2005/0165747 | A1* | 7/2005 | Bargeron et al. ............ 707/3 |
| 2005/0262044 | A1* | 11/2005 | Chaudhuri et al. ............ 707/1 |
| 2008/0306945 | A1 | 12/2008 | Chaudhuri et al. |
| 2009/0150421 | A1* | 6/2009 | Rjaibi et al. ............ 707/101 |
| 2009/0182728 | A1 | 7/2009 | Anderson |
| 2009/0210418 | A1* | 8/2009 | Arasu et al. ............ 707/6 |

(Continued)

OTHER PUBLICATIONS

Page, Clive G., "Astronomical Tables, 2-D Indexing, and Fuzzy-joins" http://ieeexplore.ieee.org/stamp/stamp.jsp? tp=&arnumber=505914, Eighth International Conference on Scientific and Statistical Database Systems, pp. 44-52, 1996-06-(18-20).

(Continued)

*Primary Examiner* — MD. I Uddin
(74) *Attorney, Agent, or Firm* — Alin Corie; Sandy Swain; Micky Minhas

(57) ABSTRACT

A fuzzy joins system that is integrated in a database system generates fuzzy joins between records from two datasets. The fuzzy joins system includes a tokenizer to generate tokens for data records and a transformer to find transforms for the tokens. The fuzzy joins system invokes a signature generator, running within a runtime layer of the database system, to generate signatures for data records based on the tokens and their transforms. Subsequently, an equi-join operation joins the records from the two datasets with at least one equal signature. A similarity calculator, running within a runtime layer of the database system, computes a similarity measure using the token information of the joined records. If the similarity measure for any two records is above a threshold, the fuzzy joins system generates a fuzzy join between such two records.

20 Claims, 6 Drawing Sheets

(56) References Cited

U.S. PATENT DOCUMENTS

2010/0106724 A1* 4/2010 Anderson ............... 707/737
2010/0312775 A1 12/2010 Haas

OTHER PUBLICATIONS

Kopcke, et al., "Learning-Based Approaches for Matching Web Data Entities" http://ieeexplore.ieee.org/stamp/stamp.jsp?tp=&arnumber=5445070, Internet Computing, IEEE, pp. 23-31, 2010-(07-08).

Medina, et al., "GEFRED. A Generalized Model of Fuzzy Relational Data Bases" http://citeseerx.ist.psu.edu/viewdoc/download;jsessionid=9E89C4C49848E3666D53DDB2433C23B0?doi=10.1.1.30.8393&rep=rep1&type=pdf, Information Sciences, Informatics and Computer Science: An International Journal, vol. 76, Issue 1-2, pp. 87-109, Jul. 1994.

Cubero, et al., "Data Summarization in Relational Databases Through Fuzzy Depenencies" http://citeseerx.ist.psu.eduNiewdoc/download?doi=10.1.52.7030&rep=rep1&type=pdf, Information Sciences: An International Journal, vol. 121, Issue 3-4, pp. 233-270, Dec. 11, 1999.

Chaudhuri, et al., "A Primitive Operator for Similarity Joins in Data Cleaning" http://ieeexplore.ieee.org/xpl/freeabs_all.jsp?arnumber=1617373, Data Engineering, 2006, ICDE '06. Proceedings of the 2nd International Conference on Data Engineering, Apr. 3-7, 2006.

Arasu, et al., "Transformation-based Framework for Record Matching" 2008 IEEE 24th International Conference on Data Engineering, http://doi.ieeecomputersociety.org/10.1109/ICDE.2008.4497412, pp. 40-49, Apr. 7-12, 2008.

* cited by examiner

INTEGRATED FUZZY JOINS IN DATABASE MANAGEMENT SYSTEMS

BACKGROUND

One of the challenges in data management is that the same entity can be represented in a database management system (DBMS) by multiple instances. For example, a customer entity "Bob Smith" may be represented in the database by more than one different instances, including "Bob Smith," "Smith, Bob F.," "Robert Symthe," etc. Such instances are also known as fuzzy duplicates. Duplication of entities can be caused by a number of reasons, such as disparate entity originations, typographical errors, etc. Existing solutions for identifying and processing such fuzzy duplicates, such as approximate string matching, de-duplication, etc., are generally specialized, stand-alone applications. For example, some solutions for managing fuzzy duplicates require extracting the data out of the database and doing the entity matching in the application layer by applying the appropriate string matching logic. Subsequently, the matched data is pushed back into the database for further processing. Generally, such solutions are separate from the underlying DBMS where the data is stored. As a result, such solutions do not leverage the query engine capabilities of database for composing queries. The additional steps employed in extracting the data from the database and pushing back of the data in the database also can also result in loss of performance efficiency and in lower application scalability.

SUMMARY

Implementations described and claimed herein address the foregoing problems by providing a system for providing a fuzzy joins system that is integrated in a database system, where the fuzzy joins system generates fuzzy joins between records from two datasets. The fuzzy joins system includes a tokenizer configured to generate tokens for data records and a transformer configured to find transforms for the tokens. The fuzzy joins system invokes a signature generator and a similarity calculator running within a runtime layer of the database system. The signature generator generates a number of integer signatures for a data records based on the tokens and their transforms. Subsequently, the records from the two datasets are joined by executing an equi-join operation on the records with equal signatures. The similarity calculator computes a similarity measure using the tokens of the joined records. If the similarity measure for any two records is above a threshold, the system generates a fuzzy join between the two records.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
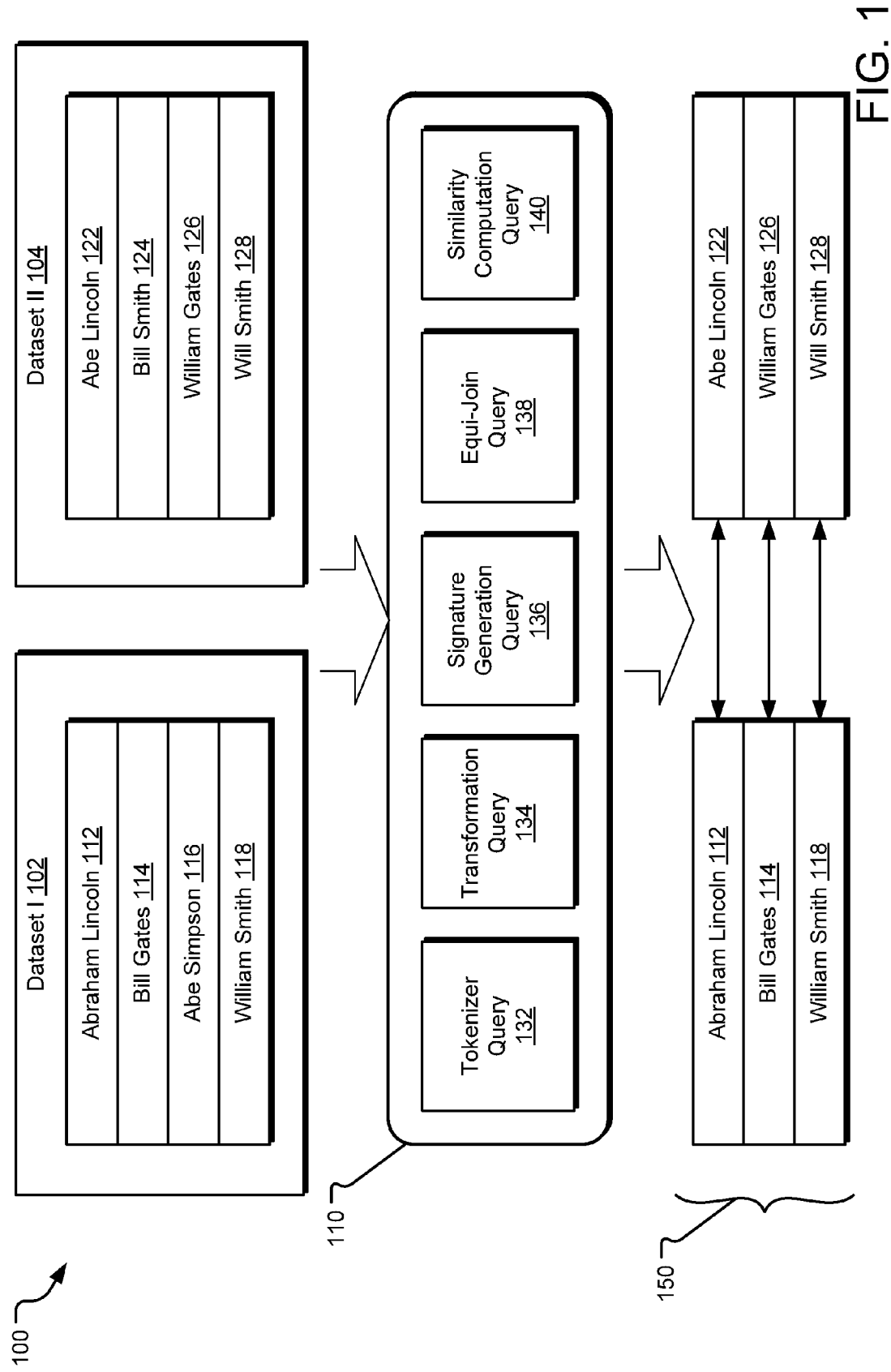
FIG. 1 illustrates example data sources and flows for an integrated fuzzy joins system.

An example fuzzy joins system disclosed herein allows integrated fuzzy matching capabilities within the database management systems (DBMS) (referred to herein as the "database systems"). The fuzzy joins system uses the resources of the database systems, such as the run-time database layer, user-defined functions, the relational operators, the shared buffer pools, and the native indexing support of the database systems, to match fuzzy duplicates within database records. The fuzzy joins system takes two datasets to generate fuzzy joins between the records of the datasets. For example, one of the datasets includes a set of reference records and the second of the datasets is a query record. The fuzzy joins system is used to determine if a fuzzy join can be created between the query record and any of the records in the reference dataset.

In one implementation, the fuzzy joins system includes a tokenizer that executes a query to tokenize the records of each of the two datasets into a number of tokens and a transformer that generates a query to transform the tokens. After generation of the transforms, a signature generator of the fuzzy joins system executes a query to generate signatures for the records of the two datasets. In one implementation, the signature generator generates the signatures such that if two records have a similarity above a threshold then they will have at least one signature in common. In other words, the signatures are generated using a scheme such that records having identical signatures are likely candidates for fuzzy joins. The signature generation is configured to execute the query to generate the signatures within a runtime layer of the database system. Executing the query within the runtime layer causes the states of the various records to be updated as appropriate through the native functionality of the database system. For example, if a record within the reference dataset is updated, running the query within the runtime layer causes the tokenizer and the transformers update the tokens and the transforms for the updated record before generating the signatures.

Subsequently, an equal-join query performs a join on the records having identical signatures. For example, if a given query record has the same signature as a particular record in the reference dataset, the equal-join query creates a join between the record identification of the query record and the record identification of that particular record from the reference dataset. Subsequently, a similarity calculator executes a query to compute a similarity measure using the tokens information of the joined records. For example, such a similarity measure provides likelihood of the similarity between the query record and the particular record from the reference dataset. For example, a similarity measure of 1.0 signifies that the two records have one hundred percent likelihood of being the same. The similarity calculator is also configured to execute the query to compute the similarity measure within a runtime layer of the database system.

The fuzzy joins system supports integrated computational runtime or virtual machine of the database system. For example, in one implementation, the fuzzy joins system is implemented inside the Microsoft™ SQL Server DBMS, which integrates the Common Language Runtime (CLR) and allows a limited set of SQL query language extensions in order to invoke various user-defined functions, such as a signature generator function, a similarity calculator function, etc.

FIG. 1 illustrates example data sources and flows for a fuzzy joins system 100. The fuzzy joins system 100 includes a dataset 102 and a dataset 104. Each of the datasets 102 and 104 includes a number of records. For example, the dataset 102 includes records 112-118 obtained from a census datasource, each of the records 112-118 related to a resident of a community. The dataset 104 includes records 122-128 obtained from a listing data source such as the White Pages™, each of the records 112-118 also related to a resident of the community. Quite often, it is likely that a resident of the community is listed in a different manner in the two datasets 102 and 104. For example, a resident Abraham Lincoln is represented in the dataset 102 as "Abraham Lincoln" 112 and as "Abe Lincoln" 122 in the dataset 104. It is quite likely that the records 112 and 122 represent the same resident of the community. Similarly, a resident William Gates is represented as "Bill Gates" 114 in the dataset 102 and as "William Gates" 124 in the dataset 104.

If the datasets 102 and 104 were to be merged to create a master data set of all the residents in the community by a rule that considers two records to be same only if they exactly match each other, the master data set will end up with two records for the resident Abraham Lincoln and the resident William Gates. The fuzzy joins system 100 generates fuzzy joins between the records that are likely to represent the same resident but which are represented somewhat differently in the two datasets 102 and 104. Specifically, the fuzzy joins system 100 uses a query module 110 that submits several queries to generate such fuzzy joins. Several of the queries within the query module 110 are configured to execute within a runtime layer of the database system containing the datasets 102 and 104. Executing such queries within the runtime layer of the database system allows the fuzzy joins system 100 to leverage various relational operators, cost-based optimizers, shared buffer pools, etc. provided by the database system Furthermore, by executing the queries within the runtime layer, the fuzzy joins system 100 is also able to use native indexing capabilities of database systems.

A tokenizer query 132 tokenizes the records into its component parts. For example, the tokenizer query 132 tokenizes the record 112 into its component parts "Abraham" and "Lincoln," the record 122 into its component parts "Abe" and "Lincoln," etc. Subsequently, a transformation query 134 finds transforms for each of the tokens generated by the tokenizer query. Thus, the transformation query 134 finds "Abe" as a transform for "Abraham," "Bill" as a transform for "William," etc.

A signature generation query 136 generates signatures for the transforms identified by the transformation query 134. Specifically, the signature generation query 136 is a table-valued function (TVF) that takes a given record as an input and returns a small set of integer signatures for the record. Note that while in the present implementation the signature are disclosed as integers, an alternate implementation may employ a signature generation method that generates non-integer signatures. In one implementation, the signature generation query 136 generates integer signatures using one of the n-gram sampling signature generation method, the inverted index signature generation method, the prefix filtering signature generation method, etc. Each of the integer signatures is generated to have a property that if two records are sufficiently similar according to a particular class of similarity functions, then they are likely to have at least one signature in common. For example, after applying the appropriate signature generation method, the signature generation query 136 calculates three distinct signature values for the "Abraham Lincoln" record 112 as "12345," "23456," and "34567." At the same time, the application of the signature generation method to the record 122 "Abe Lincoln" generates three distinct signatures "12345," "23456," and "44444." Note that two of the signatures for the "Abraham Lincoln" record 112 match two of the signatures for the "Abe Lincoln" record 122.

In one implementation, the signature generation query 136 is also configured to build a fuzzy index for each of the datasets 102, 104 with a schema of (signature, record identification), wherein the record identification is the identification of the records in the datasets 102, 104. Thus, if the record identification for the "Abraham Lincoln" record 112 is "001" in the dataset 102 and the record identification for the "Abe Lincoln" record 122 is "001" in the dataset 104, the signature generation query 136 generates index tables as follows:

TABLE I

| Record ID | Signature |
|---|---|
| 001 | 12345 |
| 001 | 23456 |
| 001 | 34567 |

TABLE II

| Record ID | Signature |
|---|---|
| 001 | 12345 |
| 001 | 23456 |
| 001 | 44444 |

An equi-join query 138 joins the records from the dataset 102 and the dataset 104 based on the signatures generated by the signature generation query 136. In the example implementation of FIG. 1, given the signatures for the record 112 and the record 122, the equi-join query generates a record join that is illustrated below:

| Record ID (dataset 102) | Record ID (dataset 104) |
|---|---|
| 001 | 001 |

A similarity computation query 140 computes a measure of similarity between the records in the dataset 102 and the records in the dataset 104 joined by the equi-join query. Specifically, the similarity computation query 140 computes similarity between the records joined by the equi-join query 138 by comparing the tokens of the joined records and the transforms of the joined records. For example, given that the record 112 is joined to the record 122, the tokens "Abe," "Abraham," and "Lincoln" of the record 112 are compared with the tokens "Abe," "Abraham," and "Lincoln" of the record 122. In one implementation, the similarity computation query 140 generates a measure of similarity between the range of 0 and 1 with the value of 1 signifying that the likelihood of the pair of records being the same is one hundred percent. Given that the transforms of the records 112 and 122 match, it is likely that in the illustrated example, the value of the similarity measure between these two records will be 1.

The query module 110 identifies all pairs of records 150 having a similarity measure above a threshold and creates a fuzzy join between the records in such pairs. As a result a fuzzy join is created between the record 112 and the record 122. Similarly, fuzzy joins are also created between the records 114 and 126 and between the records 118 and 128. Creation of such fuzzy joins allows relating records between two datasets. For example, if the datasets 102 represents a query dataset and the dataset 104 represents a reference dataset, identifying the fuzzy joins allows generating more complete and robust results for the query operation.

In one implementation of the fuzzy joins system 100, the signature generation query 136 is configured to execute within a runtime layer of the database system. Similarly, the similarity computation query 140 is also configured to execute within the runtime layer of a database system. In one implementation, the signature generation query 136 invokes an object manager, wherein the tokens for each record and the associated transforms are stored in an object, and the object manager maintains persistence of the object between two or more query operations in the database system (e.g., the signature generation query 136 and the similarity computation query 140). In one implementation, the object manager is invoked by submission of a user-defined function and is responsible for maintaining persistence of objects between server restarts, and the object manager releases unused objects from memory of the database based upon various policies. Such policies include, for example, a timeout policy, a policy based on the strength of the reference to the objects, etc. In one implementation, the signature generation query 136 is also configured to send a request to the object manager for an object, in which case the object manager returns an integer handle to the object to the signature generation query 136.

Figure 2:
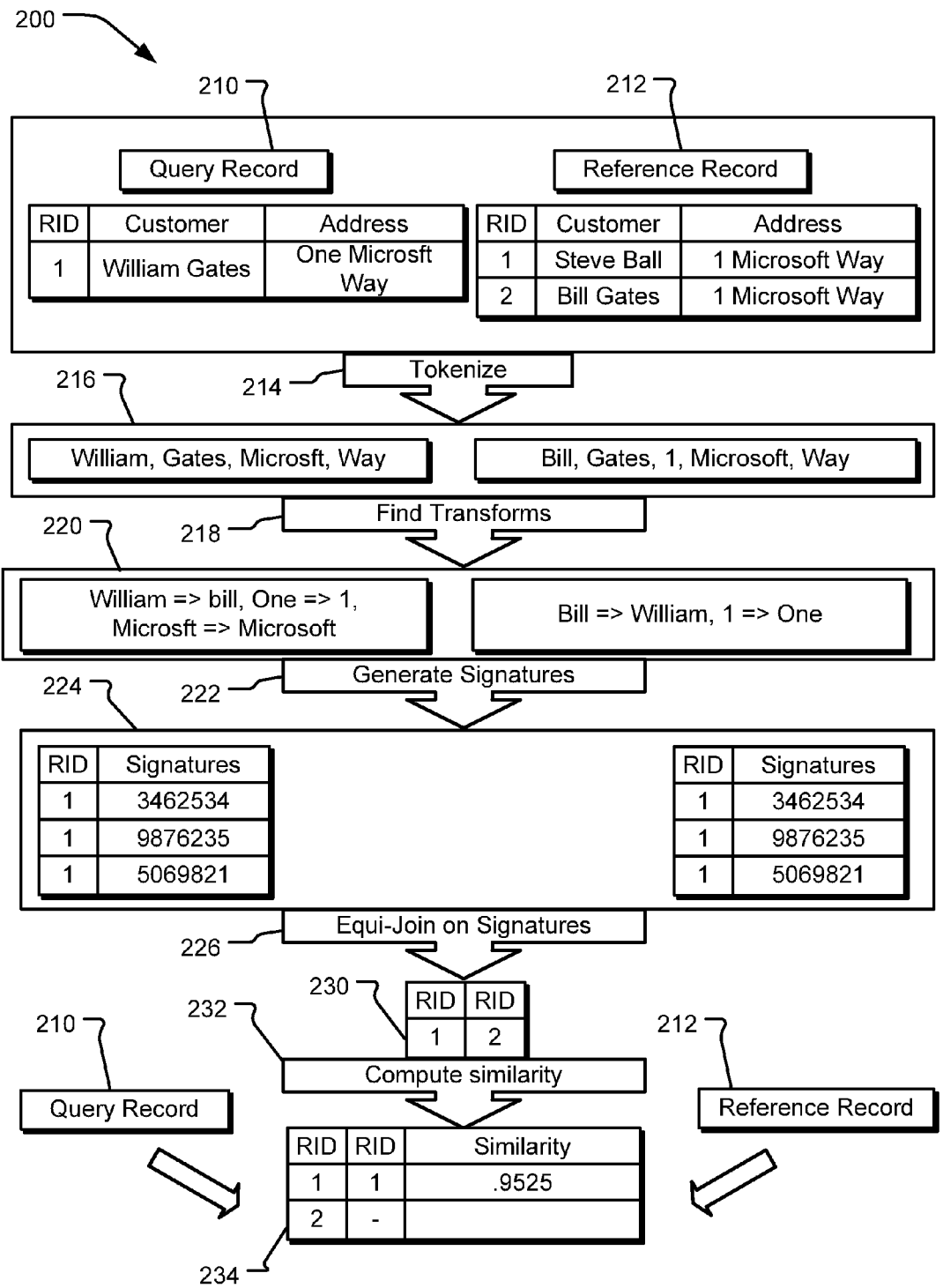
FIG. 2 illustrates alternate example data sources and flows for an integrated fuzzy joins system in a database management system.

FIG. 2 illustrates alternate example data sources and flows for an integrated fuzzy joins system 200 in a database system. The fuzzy joins system 200 creates fuzzy joins between a query record 202 and one of the records from the reference records 204. Specifically, the reference records 204 include a first record 206 and a second record 208. Each of the query record 202 and the reference records 204 has a record identification field, a customer field, and an address field. The query record 202 has a record identification of 1, the customer name "William Gates," and the address "One Microsoft Way." A quick review of the reference records 204 indicates that the second record 208, with the record identification of 2, most likely represents the same entity as the query record 202. However, if a query to find whether any of the reference records 204 is equivalent to the query record 202 is executed by comparing the customer field and the address field of the query record 202 with the reference records 204, such a query will return no matches. This is due to the variances in the values of customer field and the address field between the query record 202 and the second reference records 208.

Such variances in the values of the fields representing people, addresses, etc., are quite common. For example, such variances are generated due to differences in the rules for entering data between different datasets, typographical errors. For example, if a database is generated by scanning data from a printed source and performing a character recognition operation on such scanned information, due to the error rates in the character recognition, it is likely that the values of fields are different than the actual values. Such error can explain the value of the address field in the query record 202 being "One Microsft Way," compared to its actual value of "One Microsoft Way." The fuzzy joins system 200 allows creating fuzzy joins between such records by taking such variances into account.

A tokenizer 214 tokenizes each of the query record 202 and the reference records 204. For example, the tokenizer operation 214 creates tokenized lists 216 for each record. Each of the tokenized lists 216 includes all fields of the applicable records, other than the record identification field, with each field divided into its component parts. Thus, the query record 202 is tokenized to generate a tokenized list that includes "William," "Gates," "Microsft," and "Way." Similarly, the second reference record 204 is tokenized to generate a tokenized list that includes "Bill," "Gates," "Microsoft," and "Way."

Subsequently, a transformer 218 finds transforms 220 for various components of the tokenized lists 216. In one implementation, the transformer 218 finds such transforms using a set of transformation rules. For example, one such transformation rule provides a transform for the popular abbreviations for first names as used in a specific society, such as "Bill" for "William." Another transformation rule provides a transform for each component that is found to have a typographical error as its corrected value. Based on this rule, the component of "Microsft" is provided the transform value of "Microsoft." Similarly, another transformation rule provides a transform for each numeric value as its enumerated string, giving a transform of "one" to "1".

A signature generator 222 can be executed in the form of a user-defined function and generates signatures tables 224 for each of the query record 202 and the reference records 204. Specifically, the signature generator 222 generates a number of integer signatures associated with each of the record identifications. In one implementation, the signature generator 222 generates the integer signatures by using an n-gram signature scheme, which takes a window of characters for each token from a tokenized list and converts the characters into an integer numeric value. Thus, for example, if a window of two characters is used, a signature is generated for the character string of "Wi." "il.", "ll,", etc., for the token "William." While the signatures tables 224 illustrate that each of the record identifications is associated with only three signatures, a large number of signatures can be associated with each of the record identifications.

The n-gram signature scheme used by the signature generator 222 provides that if two records have a similarity above a threshold, then they will have at least one signature in common. However, alternate implementations of the signature generator 222 are configured to use alternate signature schemes such as an inverted index signature scheme, a prefix filtering signature scheme, etc.

Subsequently, an equi-join module 226 (e.g., a joiner) generates joins between the query record 202 and the applicable records from the reference records 204 using the signatures from the signature tables 224. Thus, if a particular reference record has at least one signature in common with the query record 202, that particular reference record is joined with the query record 202. For the example illustrated in FIG. 2, the query record 202 is joined with the second reference record 208. Thus, the equi-join module 226 generates an equi-joined table 230 joining the record identification of the query record 202 with the record identifications for the second reference record 208.

A similarity calculator 232 can be executed in a form of a user-defined function and uses the record identifications from the qui joined table 230 together with the tokenized query record 240 and the tokenized second reference record 242 to generate a similarity measure between the query record 202 and the second reference record 208. For example, given that the query record 202 is identified to have at least one signature in common with the second reference record 208, the computation similarity calculator 232 uses all tokens of the query record 202 and the second reference record 208 to compute the similarity measure between the query record 202 and the second reference record 208. The similarity measure is a value between 0 and 1, with a value of 0 signifying that the two records are not likely to be similar at all and a value of 1 signifying that the two records are almost certain to represent the same entity. For example, the query record 202 and the second reference record 208 are identified to have a similarity measure of 0.9525, signifying a vey high likelihood of this pair of records representing the same entity. Subsequently, the fuzzy joins system 200 generates fuzzy joins 234 between the pair of records having a similarity measure being above a threshold.

In one implementation of the fuzzy joins system 200, various modules are configured to execute within a runtime layer of a database system. For example, the signature generator 222 is implemented as a table valued function (TVF) to execute within a runtime layer of a database system. If the database system is a Microsoft™ SQL based system, such a TVF for the signature generator 222 integrates with the common language runtime (CLR) of the SQL based system, thus allowing the fuzzy joins system 200 to use a set of SQL query language extensions. In such an implementation, the fuzzy joins system 200 invokes an object manager by executing the signature generator 222. For example, the object manager is used to maintain persistence of an object between various query operations in the database system. Similarly, in an alternate implementation, the similarity calculator 232 is also configured to execute within a runtime layer of a database system.

Figure 3:
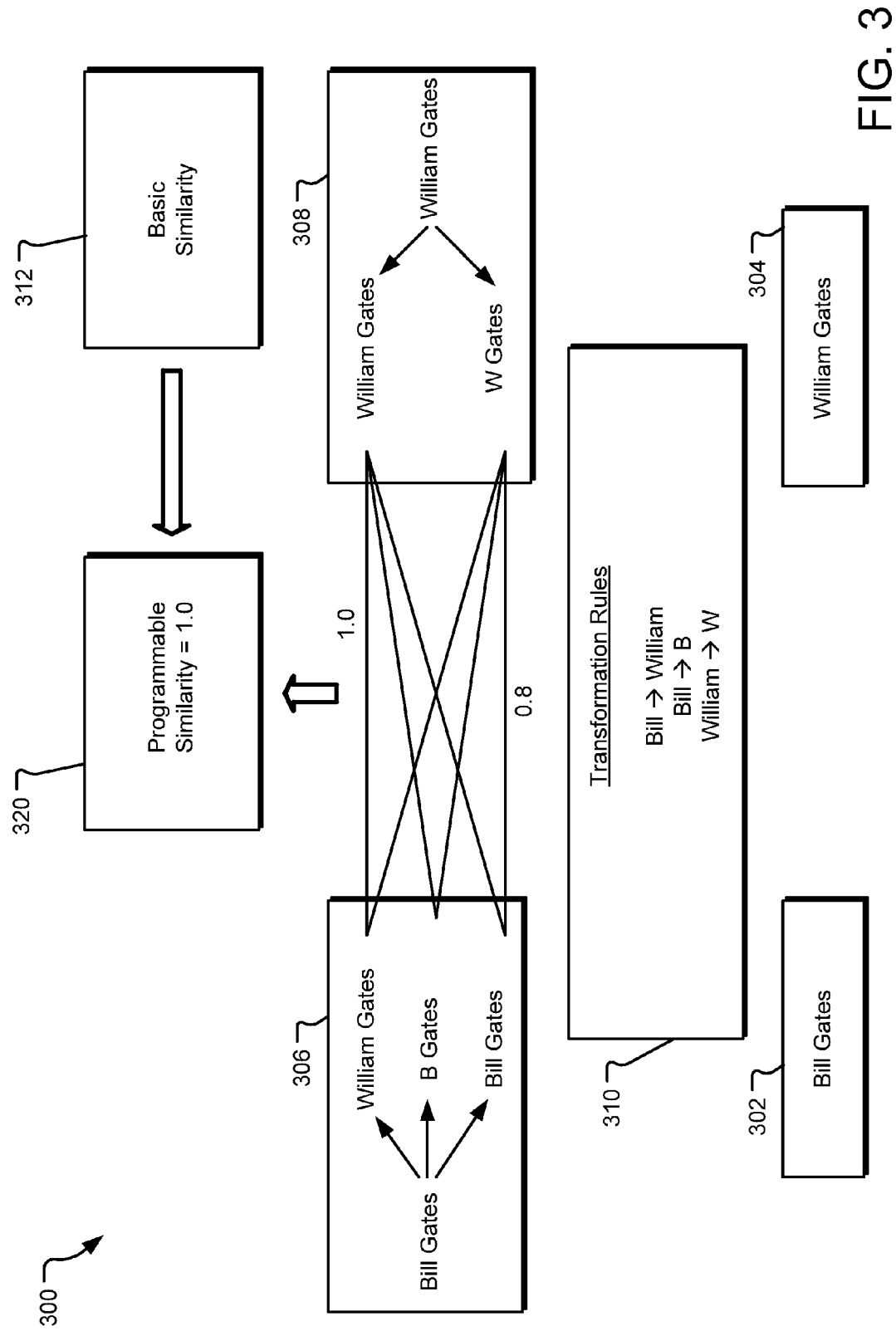
FIG. 3 illustrates example data sources and flows for computing similarity between two records.

FIG. 3 illustrates example data sources and flows for a similarity calculator 300 for computing similarity between two records. The similarity calculator 300 is illustrated to compute a similarity measure between a first record 302 "Bill Gates" and a second record 304 "William Gates." The similarity calculator 300 applies a set of transformation rules 310 to the first and the second records 302, 304. For example, the first record 302 "Bill Gates" is transformed to a list of strings where each component of the record 302 is complemented by its transform. Thus, "Bill" is transformed to "William," "B," etc. Transformed records 306 and 308 list such transforms of the records 302 and 304.

Subsequently similarly between the each instance from the list of transformed records 306 and 308 are computed. For example, a similarity measure of 1.0 is computed between "William Gates" and "William Gates," whereas a similarity measure of 0.8 is computed between "Bill Gates" and "W Gates." The resulting list of similarities is used to generate a programmable similarity 320. For example, the programmable similarity is calculated as a highest of the list of similarities. Alternately, the programmable similarity is calculated as an average of the list of similarities. In one implementation, the programmable similarity 320 is further revised by an output of a basic similarity calculator 312, which is used to assign a basic similarity between "Bill Gates" and "William Gates." In one implementation, the similarity calculator 300 is executed within a runtime layer of a database system.

Figure 4:
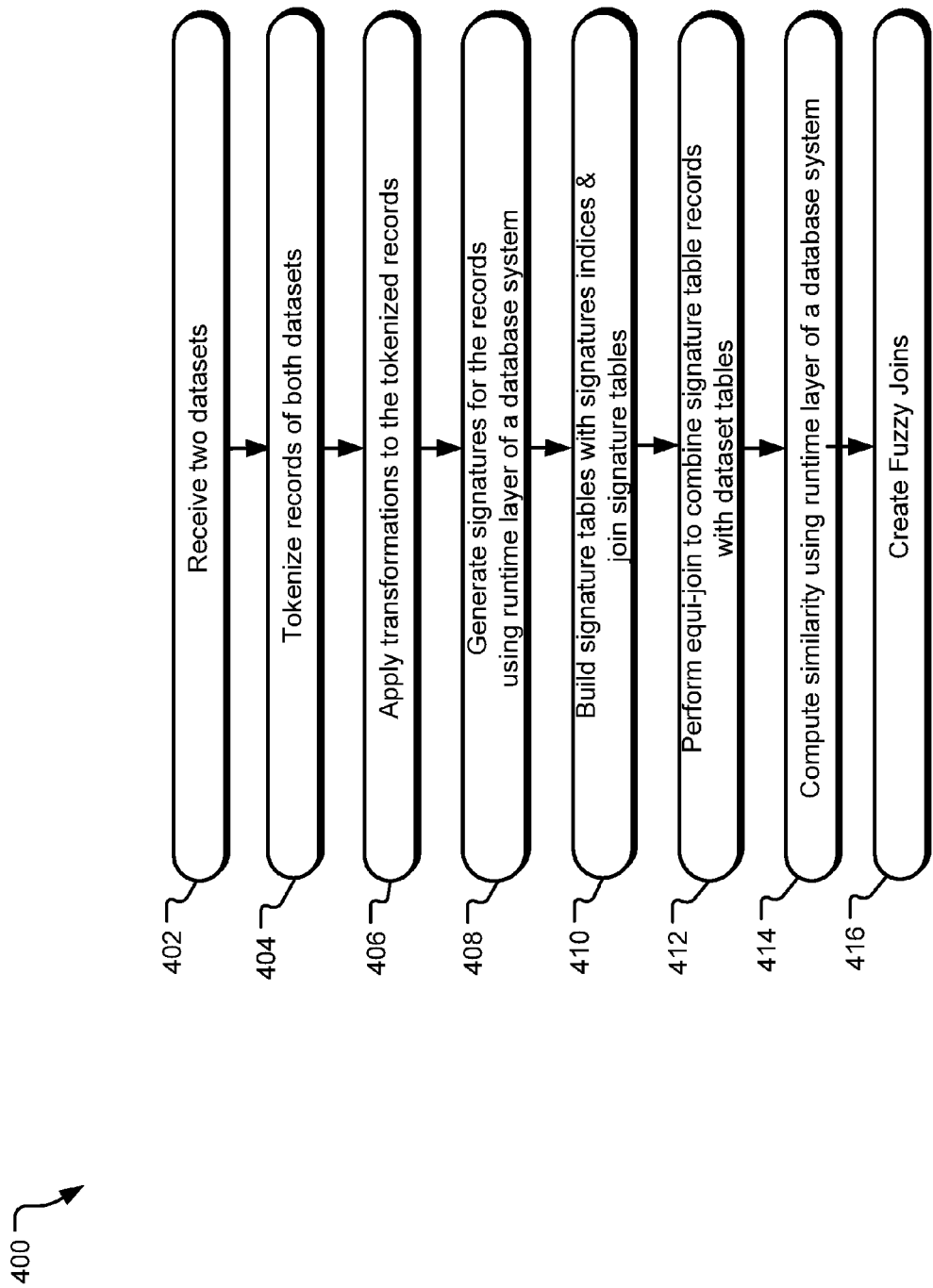
FIG. 4 illustrates example operations for providing integrated fuzzy joins in a database management system.

FIG. 4 illustrates alternate example operations 400 for providing integrated fuzzy joins in a database management system. A receiving operation 402 receives two datasets. For example, such two datasets include a first dataset based on a census data source and a second dataset based on telephone listing. A tokenizer operation 404 tokenizes the records from each of the datasets. In one implementation, the tokenizer operation generates a string of token for each record, wherein the string of tokens includes component parts from the various fields of such records. For example, if one of the records from a first data set includes a name of "Steve Jobs" and an address of "1 Milky Road," the tokenizer operation generates a string of tokens "Steve, Jobs, 1, Milky, Road."

Subsequently, a transformation operation 406 applies transforms to each component of the string of tokens. The transforms provide alternate representations for the components of the string of tokens. For example for the string of tokens "Steve, Jobs, 1, Milky, Road," a list of transforms is provided as "Steve→Stephen, Steve=S, 1→One, Road→Rd," etc. A signature building operation 408 generates signatures for the records using these transforms. In one implementation, the signature building operation 408 executes within a runtime layer of a database, such as the common language runtime (CLR) of an SQL database. The signature building operation 408 builds signatures using a signature scheme such that if two records have a similarity above a threshold then they have at least one signature in common. In one implementation, the signature building operation 408 also invokes an object manager that maintains persistence of various objects between various query operations in the database system. A signature table building operation 410 builds signature tables associating the record identifications with the signature values. For example, such a signature table building operation 410 is a table valued function (TVF) that takes a record including its transforms as an input and generates a table with a set of integer signatures associated with the record identification.

The object manager can also be used for other types of user-defined computations that employ persistence of states for various objects. In one implementation, the object manager allows implementing arbitrary theta joins that use any of the various comparison predicates (such as "less than," "greater than," "equal to," etc.). Performing such theta joins use state persistence of the objects by efficiently sharing a large amount of state information for determining whether two records to be joined satisfy the applicable theta join predicate. Using the object manager can also speed-up the repeated equi-join of a variable relation to a fixed relation by caching a hash table of the fixed relation. As a result, when a database using such object manager performs an equi-join query by using a hash join method, the database does not have to rebuild the hash table over the fixed relation each time the equi-join query is executed.

Subsequently, an equi-join operation 412 takes two signature tables, each related to the records from a different dataset, and performs an equijoin operation between the signature tables. For example, the equi-join operation 412 joins the records identifications from the two tables where such record identifications are associated with at least one common signature. In one implementation, the equi-join operation 412 also combines the other fields from the records in the first and second datasets as identified by the record identifications joined together.

A similarity computation operation 414 computes similarity measures for the pairs of records identified by the record identifications joined together by the equi-join operation 412. For example, the similarity computation operation 414 uses similarity between various fields of the joined records from the first and the second dataset to assign a numeric value between 0 and 1 to the join, with a value of 1 signifying high level of similarity between the joined records and a value representing a low level of similarity between the joined records. In one implementation, the similarity computation operation 414 is also executed within a runtime layer of a database system. Subsequently, a creation operation 416 creates fuzzy joins between the joined records by assigning the similarity measure to the join. Such fuzzy join can be used in the subsequent operations, such as merging of the datasets, searching one dataset for an entity within the second dataset, etc.

Figure 5:
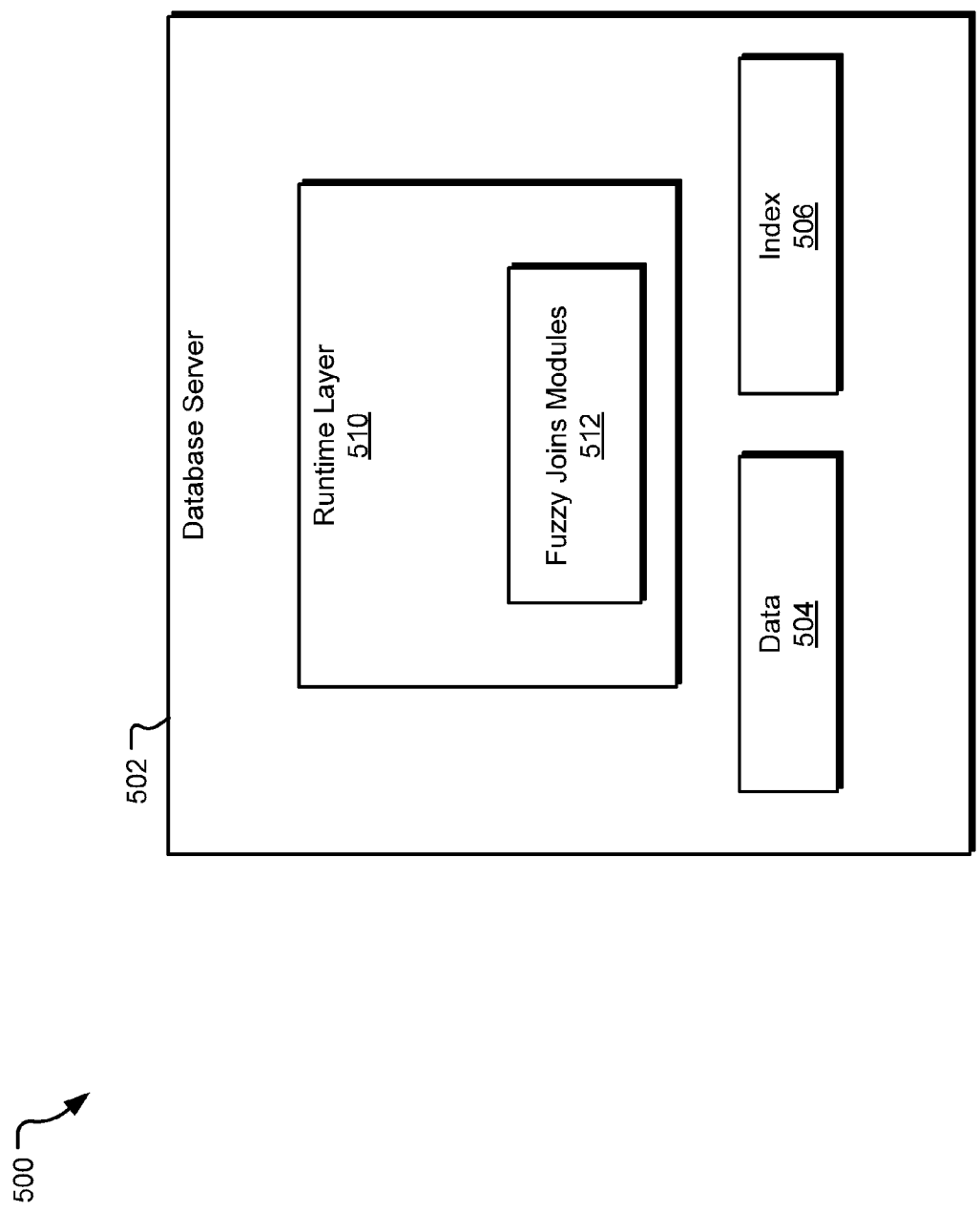
FIG. 5 illustrates example data sources and flows for a database system using fuzzy joins modules.

FIG. 5 illustrates an example data sources and flows for a database system 500 using fuzzy join modules to create fuzzy joins between datasets. The database system 500 includes a database server 502 that provides querying facility for querying the datasets. Such datasets are stored in the data module 504 of the database server 502. Various indices generated on the datasets are stored within an indexer 506. The database server 502 provides runtime layer 510 that allows various user-defined functions to access the data module 504 and the indexer 506. The database system 500 uses various fuzzy joins modules 512 that are implemented within the runtime layer 510 to generate fuzzy joins between two datasets.

Figure 6:
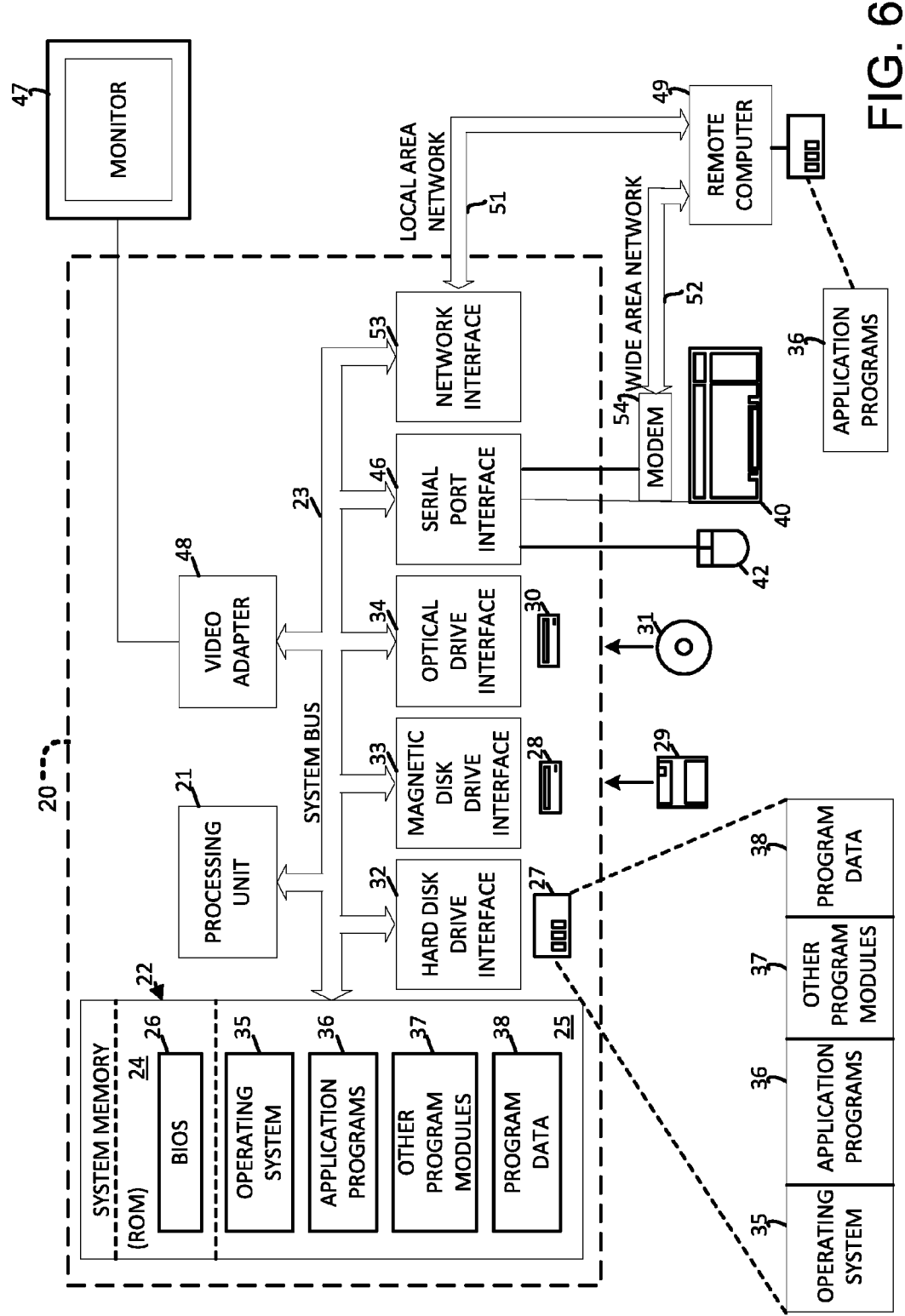
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, an integrated fuzzy joins system, various applications, and other engines and services may be embodied by instructions stored in memory 22 and/or storage devices 29 or 31 and processed by the processing unit 21. Datasets, query modules, indices, and other data used by the integrated fuzzy joins system may be stored in memory 22 and/or storage devices 29 or 31 as persistent datastores. Further, an integrated fuzzy joins system represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in another embodiment without departing from the recited claims.

What is claimed:

1. A method comprising:
   tokenizing a plurality of records of different datasets into tokens;
   determining transforms for each token of the tokenized records;
   executing a signature generation query within a runtime layer of a database system, the signature generation query generating signatures for the tokenized records using the transforms;
   building signature tables with the generated signatures;
   identifying two signature tables with at least one common signature, wherein the two signature tables are related to two of the records with different datasets;
   equi-joining the two signature tables based on their at least one common signature, wherein the equi-joining comprises joining record identifications from the two signature tables to create two equi-joined records;
   executing a similarity computation query within the runtime layer of the database system to compute a similarity measure between the two equi-joined records;
   invoking an object manager by submission of a user-defined function, execution of the user-defined function calling the signature generation query from within the runtime layer of the database system, wherein the object manager maintains persistence of an object storing the tokens for each record and the associated transforms between the signature generation query and the similarity computation query in the database system; and
   creating a fuzzy join between the two equi-joined records by assigning the similarity measure to the join when the similarity measure is above a threshold.

2. The method of claim 1, further comprising sending a request for the object from the user-defined function to the object manager.

3. The method of claim 2, further comprising returning a handle of the object from the object manager to the user-defined function.

4. The method of claim 1 further comprising:
   using the fuzzy join to merge datasets corresponding to the two equi-joined records.

5. A device comprising:
   a processor; and
   executable instructions operable by the processor, the executable instructions comprising a method for generating fuzzy loins between records, the method comprising:
   tokenizing two records of different datasets into tokens;
   determining transforms for each token of the tokenized records;
   generating signatures for the two tokenized records using the transforms;
   executing a user-defined function to perform matching of signatures within the runtime layer of a database system;
   invoking an object manager by submission of the user-defined function, the object manager maintaining persistence of an object storing the tokens for each record and the associated transforms between a signature generation query and a similarity computation query;
   building signature tables with the generated signatures;
   identifying two signature tables with at least one common signature, wherein the two signature tables are related to the two records with different datasets;
   equi-joining the two signature tables based on their at least one common signature, wherein the equi-joining comprises joining record identifications from the two signature tables and combining other fields from the records in the two different datasets as identified by the joined record identifications;
   computing a similarity measure between the two records corresponding to the two signature tables; and
   creating a fuzzy join between the two records with the at least one common signature when the similarity measure is above a threshold.

6. The device of claim 5 wherein the method further comprises sending a request for the object from the user-defined function to the object manager.

7. The device of claim 6 wherein the method further comprises returning a handle of the object from the object manager to the user-defined function.

8. The device of claim 5, wherein the method further comprises using the fuzzy join to merge datasets corresponding to the two equi-joined records.

9. The device of claim 5, wherein the method further comprises:
   executing the user-defined function within the runtime layer of the database system to perform a signature generation query for generating signatures for the two records of the two corresponding datasets within the database system.

10. The device of claim 5, wherein the method further comprises:
    executing the user-defined function within the runtime layer of the database system to perform a similarity computation query for computing the similarity measure for the two records of the two corresponding datasets.

11. The device of claim 5, wherein the method further comprises:
    executing the user-defined function within the runtime layer of the database system to compute the similarity measure for the two records of the two corresponding datasets, wherein the two datasets have at least one signature in common if the similarity measure is above a threshold.

12. The device of claim 5 wherein the method further comprises:

using the fuzzy join in a subsequent operation to search one dataset for an entity within a second dataset.

13. The device of claim 5, wherein determining transforms for each tokens of the tokenized records comprises:
determining transforms using user-defined string transformations.

14. The device of claim 5, wherein execution of the user-defined function generates cumulative algebraic signatures for records using an n-gram sampling.

15. The device of claim 5, wherein the user-defined function is a table-valued function that generates a table of integer signatures for each of the tokenized records.

16. The device of claim 5 wherein the method further comprises:
building a fuzzy index with a schema of a signature and a record identification for each of the two records.

17. A system, comprising:
a memory storing a plurality of records;
a tokenizer configured to tokenize each of the plurality of records of a first dataset and a second dataset into one or more tokens;
a transformer configured to find transforms for each of the one or more tokens;
a signature generator configured to run within a runtime layer of a database system to generate signatures for the plurality of records based on the one or more tokens and the transforms and to build signature tables with the generated signatures;
a fuzzy index generator configured to build a fuzzy index for the first dataset and the second dataset with the corresponding signature and record identifier;
an identifier to identify two signature tables with at least one common signature;
a similarity calculator configured to run within the runtime layer of the database system to generate a measure of similarity between one of the plurality of records in the first dataset and one of the plurality of records in the second dataset, wherein the signature generator is further configured to invoke an object manager configured to maintain persistence of an object storing the tokens for each record and the associated transforms between a signature generation query performed by the signature generator and a similarity computation query performed by the similarity calculator; and
a joiner configured to equi-join the two signature tables based on their at least one common signature and to create a fuzzy join between equi-joined records by assigning the similarity measure to the join, wherein the equi-joining comprises joining record identifications from the two signature tables and combining other fields from the records in the first dataset and the second dataset as identified by the joined record identifications.

18. The system of claim 17, wherein the transformer determines transforms for the tokens using user-defined string transformations.

19. The system of claim 17, wherein the fuzzy join is used to merge datasets corresponding to the two equi-joined records.

20. The system of claim 17, wherein the fuzzy join is used in a subsequent operation to search one dataset for an entity within a second dataset.

* * * * *